United States Patent [19]

Gillis, Jr.

[11] Patent Number: 4,798,862

[45] Date of Patent: Jan. 17, 1989

[54] POLYUREAS PREPARED FROM A MIXTURE OF POLYAMINES AND POLYISOCYANATE

[75] Inventor: Herbert R. Gillis, Jr., Sterrebeek, Belgium

[73] Assignee: ICI Americas Inc., Wilmington, Del.

[21] Appl. No.: 67,919

[22] Filed: Jul. 9, 1987

Related U.S. Application Data

[63] Continuation-in-part of Ser. No. 893,165, Aug. 1, 1986, abandoned.

[51] Int. Cl.⁴ .............................................. C08G 18/32
[52] U.S. Cl. ................................ 524/783; 252/182.12; 252/182.13
[58] Field of Search .................... 524/783; 528/28, 44, 528/60, 61, 62, 64, 68, 73, 76, 83; 252/182.12, 182.13

[56] References Cited

U.S. PATENT DOCUMENTS 4,530,941   7/1985   Turner et al. ........................ 521/176

Primary Examiner—Maurice J. Welsh
Attorney, Agent, or Firm—James T. Jones

[57] ABSTRACT

Polyureas are prepared from a system of (A) a polyisocyanate; and (B) a mixture of polyamines containing (i) from 60 to 25 percent by weight of the mixture of an aromatic polyamine; and (ii) from 40 to 75 percent by weight of the mixture of an aliphatic polyamine.

27 Claims, No Drawings

POLYUREAS PREPARED FROM A MIXTURE OF POLYAMINES AND POLYISOCYANATE

This is a continuation-in-part of application Ser. No. 893,165 filed Aug. 1, 1986, now abandoned.

This invention relates to a blend of polyamines useful in preparing polyureas having improved physical properties. In particular, the invention is directed to a preselected system comprising (A) a polyisocyanate and (B) a matching mixture of polyamines consisting essentially of from 25 to 60 percent by weight of the mixture of an aromatic polyamine and from 75 to 40 percent by weight of the mixture of an aliphatic polyamine. The system is used to manufacture shaped polyurea components by the reaction injection molding process (RIM) wherein the polyisocyanate and the polyamine mixture are reacted in a closed mold.

More particularly, the present invention is directed in one aspect to a blend of polyamines which consists essentially of (i) from 25 to 60% by weight of an isocyanate-reactive aromatic polyamine containing one or more aromatic rings; wherein the nitrogen atom of each reactive (primary and/or secondary) amine group is bonded directly to an aromatic ring, the molecular weight of said aromatic polyamine is between 93 and about 400, the reactive amine functionality is between 1.9 and 3.0, the aromatic polyamine is at least 50 mol percent diamines, and at least 60% of the molecular weight of said aromatic polyamine is due to the atoms contained within, or bonded directly to, aromatic rings: and (ii) from 75 to 40% by weight of an aliphatic polyamine containing acyclic, linear or branched, chains of atoms between isocyanate-reactive (primary and/or secondary) amine groups; wherein the nitrogen atom of each reactive amine group is bonded directly to aliphatic carbon atoms, the molecular weight of said aliphatic polyamine is between 170 and about 500, the reactive amine functionality of said aliphatic polyamine is between 1.9 and 2.5, and at least 50 mol percent of reactive amine containing species in said aliphatic polyamine are diamines, said blend being used as an active hydrogen composition in the manufacture, by a reaction injection molding process, of a polyurea resin having a flexural modulus greater than 200,000 psi.

In the above blend, at least 85% of the active hydrogen-containing groups are (primary and/or secondary) amine groups based on the total number of active hydrogen-containing groups in components (i) and (ii). At least 80% of the active hydrogen-containing groups in either (i) or (ii) individually must be primary and/or secondary amine groups. It is preferred that at least 50 mol percent, most preferably at least 70 mol percent of the species which make up component (i) and/or component (ii) are primary and/or secondary diamines. The flexural modulus as set forth above and in the claims refers to the modulus measured at 73° F., at full density.

The above blend may contain catalysts, additives, and supplemental reactive materials as hereinafter further disclosed. The phrase "consisting essentially of" is intended to exclude any additives or reactants in an amount which would result in any polyurea made with the blend having a flexural modulus (73° F.) less than 200,000 psi, or which would result in levels of active hydogen-containing amine groups in the blend lower than those noted above.

Above, as elswhere in the specification and claims, reference to "an aliphatic polyamine" comprehends mixtures (e.g. blends) of different aliphatic polyamines as well as single aliphatic polyamine species. The terms "an aromatic polyamine", "a polyisocyanate", and like terms are understood to be employed in the same manner to refer to mixtures (e.g. blends) of different species as well as to components consisting of a single species. "Molecular weight" and "functionality" (and, hereinafter, "equivalent weight") are correspondingly understood to be number-averaged in the case of mixtures.

The invention is directed, in a second aspect, to a reaction system used to prepare reaction injection molded polyureas comprising (A) a polyisocyanate having an isocyanate functionality from 1.8 to 4, an isocyanate equivalent weight from 60 to 1000, a viscosity from 2 to 5000 centipoises at its processing temperature, and which is at least 50 mol percent diisocyanates, and (B) a polyamine mixture consisting essentially of a blend as set forth above, i.e.

(i) from 25 to 60% by weight of an isocyanate-reactive aromatic polyamine containing one or more aromatic rings; wherein the nitrogen atom of each reactive (primary and/or secondary) amine group is bonded directly to an aromatic ring, the molecular weight of said aromatic polyamine is between 93 and about 400, the reactive amine functionality is between 1.9 and 3.0, the aromatic polyamine is at least 50 mol percent diamines, and at least 60% of the molecular weight of said aromatic polyamine is due to the atoms contained within, or bonded directly to, aromatic rings; and (ii) from 75 to 40% by weight of an aliphatic polyamine containing acyclic, linear or branched, chains of atoms between isocyanate-reactive (primary and/or secondary) amine groups: wherein the nitrogen atom of each reactive amine group is bonded directly to aliphatic carbon atoms, the molecular weight of said aliphatic polyamine is between 170 and about 500, the reactive amine functionality of said aliphatic polyamine is between 1.9 and 2.5, and at least 50 mol percent of reactive amine containing species in said aliphatic polyamine are diamines, and wherein (a) the amount of said aliphatic polyamine (B)(ii) is from about 12 to about 40 percent of the total weight of the system:

(b) at least 85% of active hydrogen-containing groups in said component (B) are primary and/or secondary amine groups;

(c) at least 80% of active hydrogen-containing groups in either (B)(i) or (B)(ii) individually are primary and/or secondary amine groups; and (d) said system is used to manufacture a polyurea having a flexural modulus greater than 200,000 psi (73° F.) and a theoretical hardblock content greater than 70%.

"Reaction system" or "system", as employed above, means an assemblage or collection of separate reactive components which, in the system, are unreacted but which, in use, are reacted only with each other.

The invention is directed, in a further aspect, to polyureas which are the product of the above reaction system and to molded articles made therefrom. The articles are made by reaction injection molding, i.e. by impingement mixing, components (A) and (B) under high pressures, injecting the mixture into a mold, and demolding the molded article which results. The molded articles may be postcured at a temperature of at least 100° C. The polyureas and articles, as indicated, have a flexural modulus greater than 200,000 psi and a theoretical hardblock content greater than 70%.

"A" Component

Polyisocyanates

The polyisocyanates useful in this invention have an average isocyanate functionality from 1.8 to 4, preferably from 2 to 3, and most preferably 2–2.3, especially 2.02 to 2.12. The polyisocyanates have an average isocyanate equivalent weight from 60 to 1000, preferably from 80 to 500, and most preferred from 125–350, a viscosity from 2 to 5000 centipoises at the processing temperature, preferably from 15 to 900 centipoises, and are at least 50 mol percent, preferably at least 75 mol percent, and most preferably at least 80 mol percent diisocyanates. Aromatic polyisocyanates are preferred.

Suitable aromatic polyisocyanates include, for example, p-phenylene diisocyanate: m-phenylene diisocyanate: 2,4-toluene diisocyanate: 2,6-toluene diisocyanate; naphthalene diisocyanate; dianisidine diisocyanate; polymethylene polyphenyl polyisocyanates; 2,4'-diphenylmethane diisocyanate (2,4' MDI): 4,4'-diphenylmethane diisocyanate (4,4'MDI): 3,3'-dimethyl-4, 4'-biphenylene diisoyanate; polydiphenylmethane diisocyanate having a functionality greater than 2 mixtures thereof and the like. The MDI (2,4' and 4,4') and mixtures and derivatives thereof are most preferred.

Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like.

Suitable uretonimine-modified diisocyanates are prepared by a process wherein a polyisocyanate, generally an aromatic polyisocyanate, is heated to a temperature exceeding the melting temperature of the polyisocyanate, for example, 140° C., in the presence of a carbodiimide catalyst to convert some of the isocyanate groups to carbodiimide groups and then allowing the carbodiimide groups to react with unreacted isocyanate groups to form uretonimine groups.

Suitable isocyanate terminated prepolymers are prepared by reacting an excess of polyisocyanate with polyols, which may include aminated polyols. Suitable polyols include, for example:

(a) polyether polyols and/or hydrocarbon-based polyols having a molecular weight from 60 to 400, and an average hydroxyl functionality from 1.9 to 2.5;

(b) polyether (and/or thioether) polyols having a molecular weight of at least 1000 and an average hydroxyl functionality from 1.9 to about 4;

(c) polyester polyols having a molecular weight from 100 to 1000, and an average hydroxyl functionality from 1.9 to 2.5;

(d) polyester polyols having a molecular weight greater than 1000, and an average hydroxyl functionality from 1.9 to 4;

(e) amine terminated polyethers having a molecular weight of at least 1000, and an average amine hydrogen functionality from 1.9 to 6.

Examples of suitable polyether or hydrocarbon polyols having a molecular weight from 60 to 400 include propylene glycol; dipropylene glycol; tripropylene glycol: 2,3-butanediol: 1,3-butanediol 2,2-dimethyl-1,3-propanediol and polypropylene glycols. Examples of suitable polyether polyols having a molecular weight of at least 1000 include polyethylene glycols; polyoxyethylene polyoxypropylene copolymer diols; and polytetramethylene glycols, higher polypropylene glycols, polyoxypropylene triols, etc. The polyoxypropylene based polyols are preferred.

Examples of suitable polyester polyols having a molecular weight from 100 to 500 include aliphatic polyester diols, and aromatic polyester diols. These polyester diols are obtained from the reaction of dibasic carboxylic acids such as succinic, adipic, suberic, azelic, phthalic, isophthalic, and the like, with alkylene glycols, and oxyalkylene glycols to form the corresponding polyalkylene, and polyoxyalkylene ester diols or copolymers thereof. Examples of suitable polyester polyols having a molecular weight of at least 1000 include the polyester diols and triols obtained from the reaction of polybasic carboxylic acids, and alkylene polyols, and/or oxyalkylene polyols, to form the corresponding polyalkylene and polyoxyalkylene esters or copolymers thereof having a molecular weight of at least 1000.

Examples of suitable amine terminated polyethers having a molecular weight of at least 1000 include polypropylene oxide triamines polyoxypropylene diamines, and polyoxyethylene/polyoxypropylene copolymer diamines and triamines.

"B" Component

Polyamine Blend

Aromatic polyamines useful in this invention have primary and/or secondary isocyanate reactive amine groups attached to aromatic rings, a number averaged molecular weight which ranges from 93 to about 400, preferably from 108 to 300, an average primary and/or secondary amine functionality from 1.9 to 3, preferably from 2 to 2.5, and at least about 50 mol percent diamines, preferably 70 mol percent diamines, wherein at least 60 percent of the molecular weight and preferably at least 70 percent of the molecular weight consists of atoms contained within or bonded directly to the aromatic rings.

Examples of suitable aromatic polyamines include 3,5-diethyl-2,4-toluenediamine; 3,5-diethyl-2,6-toluenediamine; DETDA which is a mixture of about 80 percent by weight 3,5-diethyl-2,4-toluenediamine and about 20 percent be weight 3,5-diethyl-2,6-toluenediamine; 1,3,5-triethyl-2,6-diaminobenzene; 2,4-diaminotoluene; 2,6-diaminotoluene; 2,4'-diaminodiphenylmethane; 4,4'-diamino-diphenylmethane; 3,3'-dimethyl-5,5'-diethyl-4,4'-diaminodiphenylmethane; polyphenyl-polymethylene polyamines; and the like.

The aliphatic polyamine compositions useful in this invention contain acyclic, linear or branched, chains of atoms between reactive (primary and/or secondary) amine groups. These amine groups (by definition) are bonded directly, via the amine nitrogen atom, to aliphatic carbon atoms of the connecting chain(s). The number averaged molecular weight of the aliphatic polyamine (or mixture of aliphatic polyamines) used in this invention is between about 170 and about 500, preferably between 200 and 450; and the number averaged isocyanate reactive amine functionality is between 1.9 and 2.5, preferably between 2 and 2.3. The aliphatic polyamine composition should be at least 50 mol percent, preferably at least 70 mol percent diamines.

It is preferred that the aliphatic amine composition be substantially free of reactive amines of molecular weight greater than 600. It is most preferred that the composition be free of molecular amine species of greater than 550 molecular weight.

It is preferred that the aliphatic amine composition be substantially free of individual (reactive amine containing) molecular species of molecular weight less than 170. If molecular amine species of molecular weight lower than 170 are present, they should constitute less than 20% by weight of the total aliphatic amine composition; and less than 5% of the total polyurea composition (by weight, relative to the total weight of reactive components).

It is preferable that a majority of any primary aliphatic amine groups within the aliphatic amine composition, most preferably greater than 80% of these primary amine groups, are bonded directly (via the amine nitrogen atom) to secondary and/or tertiary carbon atoms.

In addition to the acyclic aliphatic chains of atoms, the aliphatic polyamine comPositions used in this invention may optionally also contain some cyclic structures provided that less than 60, preferably less than 50, percent of the molecular weight of the polyamine composition is due to atoms which are incorporated into or bonded directly to rings having 7 members or less.

Examples of suitable aliphatic polyamines include the amine-terminated polyethers such as those represented below:

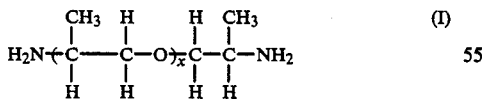  (I)

wherein x has an average value between 2 and about 6.

Polyether diamines such as Formula I, above, may be used as mixtures with higher functionality polyether polyamines such as Formula II (below), provided that the mixture meets the requirements of number averaged amine functionality and equivalent weight described previously:

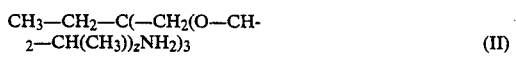  (II)

wherein z has an average value between about 1 and about 2. Other examples of these aliphatic-amine compositions include:

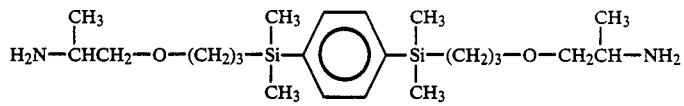

Amine Hydrogen Equivalent Weight = 106
Reactive Amine Equivalent Weight = 212
Molecular Weight = 424

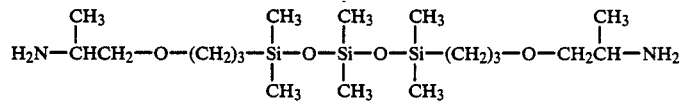

Amine Hydrogen Equivalent Weight = 109.5
Reactive Amine Equivalent Weight = 219
Molecular Weight = 438

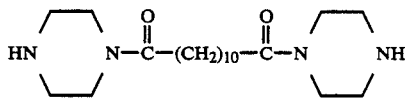

Amine Hydrogen Equivalent Weight = 183
Reactive Amine Equivalent Weight = 183
Molecular Weight = 366
An 83:17 (w/w) blend of a diamine of formula I, having x=6, and piperazine;
Number Averaged Molecular Weight = 254
Number Averaged Reactive Amine Equivalent Weight = 127
Number Averaged Amine Hydrogen Equivalent Weight = 84.6

Polyamines having kinetic symmetry are preferred. Kinetic symmetry, as applied to the amine, means that at least two of the amine groups on a particular molecule react with isocyanate at a similar rate and that the reaction of the first amine group does not deactivate the other amine group(s). Kinetic symmetry is preferred for both the aromatic and for the aliphatic amine ingredients in component B. Polyamines possessing kinetic symmetry generally share these characteristics:

(i) The reactive amine groups are of the same type
(ii) The reactive amine groups are located in very similar steric environments
(iii) The reactive amine groups are not electronically conjugated, attached to the same aromatic ring, or attached to the same conjugated system of aromatic rings.

Geometric symmetry is not always equivalent to kinetic symmetry. It is believed that a high degree of kinetic symmetry is also preferable for the other key reagents in the formulations of the invention. In particular, for the polyisocyanate.

Examples of aromatic polyamines having a high degree of kinetic symmetry include, for example, 4,4'-diamino diphenylmethane; 3,3',5,5'-tetramethyl-4,4'-diamino diphenylmethane; 3,3'-dimethyl-5, 5'-diethyl-4, 4'-diaminodiphenylmethane which can be represented by

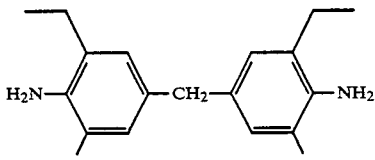

Examples of aliphatic polyamines having a high degree of kinetic symmetry include

where y has an average value from about 2 to about 6.

In addition to the polyamines described above, the systems of this invention may also optionally contain supplemental higher molecular weight isocyanate reactive hydrogen-containing material. At least 70% of active hydrogen-containing groups in this optional high molecular weight active hydrogen-containing material, and preferably at least 85%, are primary and/or secondary amine groups. The ratio, by weight, of chain extender system components (B)(i) plus (B)(ii) to this optional high molecular weight polyamine is greater than 1.5:1, preferably greater than 2:1. A preferred group of high molecular weight active hydrogen-containing materials useful in this invention have an average molecular weight of at least 1500, preferably at least 2000 up to about 100,000, an average active hydrogen group functionality from 2 to 6, preferably from 2 to 3, active hydrogen containing groups.

Examples of suitable high molecular weight active hydrogen-containing materials include amine terminated polyethers, amine terminated organopolysiloxanes, amine terminated polymers with hydrocarbon main chain, amine terminated polyamides etc. Suitable amine terminated polyethers are of molecular weight about 2000 to about 12,000 and are made from an appropriate initiator such as glycerol, ethylene glycol or trimethylolpropane, to which lower alkylene oxides such as ethylene oxide, propylene oxide, butylene oxide or mixtures thereof are added. The resulting hydroxyl terminated polyol is then aminated. When two or more oxides are used, they may be present as random mixtures or as blocks of one or the other polyether. In the amination step secondary hydroxyl groups aminate more easily. Normally, the amination step does not completely replace all of the hydroxyl groups. For use in the invention, compounds having at least 70 percent of the hydroxyl groups converted to primary and/or secondary amine groups are required and those having at least 85 percent are most preferred.

If ethylene oxide is used, it is desirable to cap the hydroxyl terminated polyol with a small amount of higher alkylene oxide so that the terminal hydroxyl groups are secondary hydroxyl groups. The polyols so prepared are then reductively aminated by prior art techniques, for example, as disclosed in U.S. Pat. No. 3,654,370, incorporated herein by reference.

In the practice of this invention, a single high molecular weight amine terminated polyether may be used. Also, mixtures of high molecular weight amine terminated polyethers such as mixtures of di- and tri-fuactional materials and/or different molecular weights or different chemical composition materials may be used.

Suitable amine terminated organopolysiloxanes include, for example, those represented by the formula

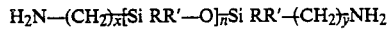

where
R and R' are aryl groups or alkyl groups containing from 1 to 8 carbon atoms including methyl, ethyl, propyl, butyl, phenyl, pentyl, hexyl, octyl, or branched chains thereof, cyclobutyl, cyclopentyl, cyclohexyl, cycloheptyl, and cyclooctyl, and R and $R^1$ may be the same or different, x and y have values from about 3 to about 10, and x and y may be the same or different, and n is selected such that the formula has a molecular weight of at least about 1500. A specific example of such a polysiloxane material is PS-513, which is commercially available from Petrarch Systems Inc. This is a linear polydimethyl siloxane fluid which contains terminal aminoproyl groups. The material is a diprimary diamine having a molecular weight of about 28,000.

Suitable amine terminated reactive liquid polymers having hydrocarbon main chains are disclosed in U.S. Pat. No. 4,535,147, which is incorporated by reference. An example of such an amine terminated reactive liquid polymer is represented by the formula

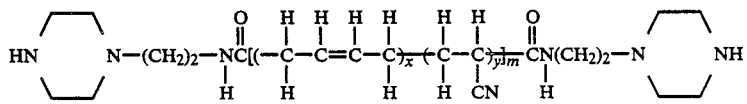

where
x may be 1-10, and
y may be 0-5, and
m is selected such that the formula has a molecular weight of at least 1500.

Such reactive liquid polymers are commercially available from B. F. Goodrich as HYCAR ATBN 1300×16 and HYCAR ATBN 1300×21.

The supplemental high molecular weight isocyanate reactive m.aterial may further comprise a portion of polyols which have an average molecular weight of at least 1000 and an average hydroxyl functionality from 2 to 8, but wherein the hydroxyl groups contributed by the polyols do not result in lower amination levels than those previously indicated. That is, at least 70% of active hydrogen groups in the supplement material, and preferably at least 85%, must be primary and/or secondary amine groups. Examples of suitable high molecular weight polyols include polyether polyols. Polyether polyols include, for example, hydroxyl terminated polyoxpropylene: polyoxypropylene-polyoxyethylene copolymers: polyoxypropylene-polyoxybutylene copolymers; and polytetramethylene oxide.

If a high molecular weight active hydrogen-containing material is used, the amount of high molecular weight active hydrogen-containing material is expressed relative to the amount of the mixture of low molecular weight polyamines. The ratio of the weight of the mixture of low molecular weight polyamines (i.e. (B)(i) plus (B)(ii)) to the weight of the active hydrogen-containing high molecular weight material is from 1.5:1 to 100:1.

Additives

The system of the present invention may further include additives such as internal mold release agents, catalysts, surfactants, blowing agents, fillers and the like. Suitable internal mold release agents include, for example, copper stearate, zinc stearate and a dimethyl siloxane with organic acid groups which is commercially available as Dow-Corning Q2-7119 from Dow-Corning Corporation. The amount of internal mold release agent used can be from 0.001 to 3.0 percent by weight of the total reactants.

Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octaoate, stannous oleate, or a mixture thereof.

Tertiary amine catalysts include trialkylamines which include, for example, trimethylamine, triethylamine: heterocyclic amines such as N-alkylmorpholines which include, for example, N-methylmorpholine, N-ethylmorpholine; 2,2′-bis(dimethylamino)diethyl ether; 1,4-dimethylpiperazine, triethylenediamine and aliphatic polyamines such as N,N, N′,N′-tetramethyl-1,3-butanediamine or N-methyl diethanolamine. The amount of catalyst used is less than about 5 percent by weight of the total reactants, preferably less than 1%. Combinations of tertiary amine and organotin catalysts are frequently used in the art. Isocyanurate catalysts, such as alkalai metal salts of carboxylic acids, may also be added to the formulations of the invention.

Another group of catalysts, which are more specific for the isocyanate-amine reaction, include carboxylic acids, and precursors thereof (such as acid anhydrides). Specific examples of carboxylic acid catalysts include oleic acid, 1,12-dodecanedioic acid, isophthalic acid, etc. These types of catalysts are described in U.S. Pat. Nos. 4,499,254; 4,487,908; and 4,487,912.

Catalysts may be useful as processing aids in some formulations.

Suitable surfactants include, for example, sodium salts of castor oil sulfonates; alkali metal or ammonium salts of sulfonic acid such as dodecyl benzene sulfonic acid; and polyether siloxanes having a structure such that a copolymer of ethylene oxide and propylene oxide is attached to a polydimethyl siloxane radical. The amount of surfactant used is less than about 3 percent by weight of the total reactants.

Suitable blowing agents include, for example, water, low boiling halogenated hydrocarbons such as methylene chloride and trichloromonofluoromethane. The amount of blowing agent used is less than about 4 percent by weight of the total reactants.

Suitable fillers include fiberglass reinforcement fibers, particularly those having lengths of from about 1/16 inch (0.16 cm) to about ½ inch (127 cm) and milled glass fibers having a length of 1/16 inch (0.16 cm), ⅛ inch (0.32 cm) or ¼ inch (0.64 cm) and the like. Shorter fibers are always preferred, for ease of processing. Other particularly suitable fillers are mica, fumed silica, flake glass, Wollastonite and the like. Coupling agents, such as amino or epoxy silane types, may be used to improve adhesion between the reinforcing filler and the polymer. Other optional additives include fire retardants, smoke suppressants, plasticizers, dyes, and pigments, each individually used in amounts of about 5% by weight of the total system, or less. The additives may be incorporated into either component of the reactive system, or both components, provided that the additives are compatible with the component(s) chosen. Alternatively, any or all of the additives may, if possible, be incorporated into the polymers as a third stream.

Polyurea System

The polyureas of the present invention comprise the reaction products of an "A" Component (a polyisocyanate), with the "B" Component (the mixture of aliphatic/aromatic low molecular weight amines of the invention and other supplemental reactants having active hydrogen). The mixture of low molecular weight amines in the "B" Component blend comprises from 25 to 60 percent by weight of said mixture of an aromatic polyamine and from about 75 to about 40 percent by weight of said mixture of an aliphatic polyamine. Optionally a minor amount of high molecular weight isocyanate reactive amine containing compounds may be included. When these high molecular weight compounds are used, the weight ratio of the low molecular weight aliphatic/aromatic amine mixture to the optional high molecular weight compounds may range from 1.5:1 to 100:1. A ratio of 2–10 is preferred. The amount of low molecular weight aliphatic polyamine as a percent by weight of the total reactants (in the "A"+"B" Components) ranges from 12 to 40 percent by weight, preferably from 12.5 to 30 percent by weight.

Process

The polyureas of the present invention can be shaped into useful articles such as automobile panels, by reaction injection molding (RIM) process, which is performed in a RIM machine.

Examples of RIM machines include Admiral 2000 HP RIM Machine (Admiral Equipment Corp., Akron, Ohio), The Cincinnati Milacron RIMM 90 Machine (Cincinnati Milacron Corp., Cincinnati, Ohio), The Cincinnati Milacron LRM-2 impingement mix RIM machine, and the like.

In the RIM process, the polyisocyanate is referred to as the "A" Component, and the "B" Component refers to the mixture of active hydrogen-containing material, sometimes referred to as chain extenders (and polyols/polyamines), and/or additives. In a "B" Component having a mixture, the active hydrogen-containing reactants may be blended in a suitable container and agitated at a temperature, from about 20° C. to about 200° C., for a time between five and sixty minutes using a high sheer blade such as a Cowles blade, at a rotational speed of 50 to 2500 rpm.

The "A" and "B" Components are placed in separate containers, which are generally equipped with agitators, of the RIM machine wherein the temperature of the "A" Component is 20° to 100° C. and the temperature of the "B" Component is from 20° C. to 125° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is generally necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amount of the "A" and the "B" Components pumped to the mix head is measured as the ratio by weight of the "A" Component to the "B" Component wherein the ratio is from 0.33:1 to 3:1 preferably between 0.8:1 and about 1.25:1 depending upon the reactants used and the isocyanate index desired.

The impingement mixed blend of "A"/"B" components is injected into a mold at a velocity from 0.3 lb/sec to about 35 lb/sec. The mold is heated to a temperature from about 20° C. to 200° C. Suitable molds are generally made of metal such as aluminum or steel. Usually an external mold release agent is applied.

A molded polyurea article is formed after the impingement mixture is in a closed mold from about 5 seconds to about 30 seconds. The mold is then opened and the polyurea molded product is removed from the mold. The molded product may be post cured by placing the product in an oven having a temperature between 100° C. and about 200° C. for a time from about ½ hour to about 3 hours. Polyureas of the invention are easily processable and can usually be demolded without damage.

Although not essential to the successful practice of this invention, it is within the scope of the invention to incorporate reactive ingredients into the formulations of the invention, in minor amounts, which are different from the types of reactants specifically described herein.

The formulations of the invention are processed at an isocyanate index between 0.70 and 1.50, preferably between 0.95 and 1.10; with the proviso that, if a catalyst for the conversion of isocyanate to isocyanurate groups is present, the index may extend up to about 5.00.

Physical Properties

The physical properties of the RIM polyureas, specifically the combination of flexural modulus, impact resistance, and CLTE are significantly improved without significant reduction in other properties.

The flexural modulus property of a RIM polyurea is a measure of its resistance to bending and flexing and is measured according to the test method ASTM D 790. The polyureas of the present invention have a flexural modulus of between about 200,000 and about 500,000 psi at 73° F. (i.e. at full density) when not reinforced. When 100% of the total reactants consists of polyisocyanate and only the mixture of polyamines ((B)(i) plus (B)(ii), See examples 1, 12, 13 and 14), the flexural modulus at 73° F. ranges from about 309,000 psi to about 410,000 psi.

The coefficient of linear thermal expansion (CLTE) is measured according to the test method ASTM D 696. The polyureas of the present invention have a CLTE of less than about $10 \times 10^{-5}$ in/in/°C. and generally less than $8.5 \times 10^{-5}$.

Heat sag and notched Izod properties are measured according to ASTM D 3769 and ASTM D 256 procedures respectively. The polyureas of this invention preferably exhibit a heat sag of less than 2 inches after 1 hour at an oven temperature not lower than 150° C., preferably at 163° C., at a 6 inch overhang.

EXAMPLES

The following examples serve to illustrate but not limit the scope of the present invention.

Following is a list of materials, employed in the examples.

Polyisocyanate A
  Uretonimine modified 4,4'-diphenylmethanediisocyanate having an average isocyanate equivalent weight of about 143; commercially available from Rubicon Chemicals, Inc. as LF 168.

Polyisocyanate B
  A mixture of diphenylmethanediisocyanates containing about 80% 4,4'-isomer and about 20% of 2,4'-isomer.

Polyisocyanate C
  Uretonimine modified high-2,4'-MDI polyisocyanate with an average isocyanate equivalent weight of about 135.5 and contains about 20% 2,4'MDI isomer.

Polyisocyanate D
  A prepolymer of pure 4,4'-MDI having an average isocyanate equivalent weight of about 181; commercially available from Rubicon Chemical, Inc. as LF-179.

Polyisocyanate F
  Polyphenylmethylene polyisocyanate (Crude MDI) having an average isocyanate equivalent weight of about 133.3 and an average isocyanate functionality of 2.75; commercially available from Rubicon Chemicals Inc. as Rubinate ® M.

Polyisocyanate G
  Pure 4,4-MDI which contains not more than 2% by weight of the 2,4'-isomer; commercially available from Rubicon Chemical, Inc. as Rubinate-44.

Polyamine A (aromatic)
  Diethyltoluene diamine, 80% by weight 3,5-diethyl-2,4-toluenediamine and 20% by weight 3,5-diethyl-2,6-toluenediamine.

Polyamine B (aliphatic)
  Amine terminated 400 molecular weight polyoxypropylene diamine commercially available as JEFFAMINE D-400 from Texaco, Inc.

Polyamine C (aliphatic)
  Amine terminated 230 molecular weight polyoxypropylene diamine commercially available as JEFFAMINE D-230 from Texaco, Inc.

Polyamine D (aromatic)
  3,3'-dimethyl-5,5'-diethyl-4,4'-diamino-diphenylmethane.

Polyamine E (aromatic)
  Polyphenyl-polymethylene polyamine.

Polyamine F (aliphatic)
  Piperazine

Polyamine G (aliphatic)
  m-xylylene diamine

Polyamine H (active hydrogen containing ingredient)
  Amine terminated 2000 molecular weight polyoxypropylene diamine commercially available as JEFFAMINE D-2,000 from Texaco, Inc.

Polyamine I (active hydrogen containing ingredient)
  Amine terminated 5000 molecular weight polyoxypropylene triamine commercially available as JEFFAMINE T-5,000 from Texaco, Inc.

Polyol A (active hydrogen containing ingredient)
  An aliphatic polyester diol having a molecular weight of 321, commercially available as PBA-5044 from Imperial Chemical Industries.

Polyol B (active hydrogen containing ingredient)
An aromatic polyester polyol having a molecular weight of 466 (number averaged) and 2.05 functionality, commercially available as Chardol-327 from Chardonal Company.

Following is a list of nomenclature, employed for brevity in the examples.

Content I: Percent by weight of the low molecular weight aliphatic polyamines to the total reactants Content II: Percent by weight of the theoretical reaction product of the aliphatic polyamine hydrogen atoms with a stiochiometric quantity of polyisocyanate based on the total weight of the reactants.

Content III: Ratio of the mixture of aliphatic/aromatic polyamines to the active hydrogen containing high molecular weight ingredients. The ratio based on the weight for each item.

Content IV: Percent by weight of the aromatic polyamine to the mixture of low molecular weight aliphatic/aromatic polyamines.

Index: The ratio of the total number of equivalents of isocyanate groups in a particular formulation to the total number of equivalents of active hydrogen containing groups (hydroxyl groups+primary amine groups+secondary amine groups, etc.).

Properties of Chemicals

Tables I, II and III set forth further properties including molecular weight, equivalent weight, functionality and kinetic symmetry where applicable, to the materials listed. All molecular weights, equivalent weights, and functionalities are number averaged.

TABLE I

| | MOLECULAR WEIGHT | NCO EQUIVALENT WEIGHT | NCO FUNCTIONALITY | KINETIC SYMMETRY |
|---|---|---|---|---|
| Polyisocyanate A | 308 | 143.3 | 2.15 | Yes |
| Polyisocyanate B | 250 | 125 | 2 | No |
| Polyisocyanate C | 282 | 135.5 | 2.08 | No |
| Polyisocyanate D | 362 | 181 | 2 | Yes |
| Polyisocyanate F | 366.6 | 133.3 | 2.75 | Yes |
| Polyisocyanate G | 250 | 125 | 2 | Yes |

TABLE II

| (Polyamine) | MOLECULAR WEIGHT | REACTIVE AMINE FUNCTIONALITY | AMINE EQUIVALENT WEIGHT | AMINE HYDROGEN FUNCTIONALITY | AMINE HYDROGEN EQUIVALENT WT | KINETIC SYMMETRY |
|---|---|---|---|---|---|---|
| A | 178.2 | 2 | 89.1 | 4 | 44.6 | NO |
| B | 400 | 2 | 200 | 4 | 100 | YES |
| C | 230 | 2 | 115 | 4 | 57.5 | YES |
| D | 282.4 | 2 | 141.2 | 4 | 70.6 | YES |
| E | 295 | 2.75 | 107.3 | 5.5 | 53.65 | YES |
| F | 86 | 2 | 43 | 2 | 43 | YES |
| G | 136 | 2 | 68 | 4 | 34 | YES |
| H | 2000 | 2 | 1000 | 4 | 500 | YES |
| I | 5000 | 3 | 1666 | 6 | 833 | YES |

TABLE III

| | MOLECULAR WEIGHT | EQUIVALENT WEIGHT | FUNCTIONALITY |
|---|---|---|---|
| Polyol A | 321 | 160.5 | 2 |
| Polyol B | 466 | 227.3 | 2.05 |

EXAMPLE 1

The formulation found in Table IV was processed in a mini RIM machine; a laboratory model developed by the University of Minnesota having pneumatically driven pistons. About 4149.7 grams of Polyisocyanate D was placed in a container on the RIM machine and maintained at 163° F. (72.8° C.). The "B" Component including 1,165.2 grams of Polyamine A and 1,834.8 grams of Polyamine B were blended together in a mixer containing a Lightning stirrer. A portion of the "B" Component was placed into a separate container in the RIM machine and maintained at 103° F. (30° C.). The "A" Component and "B" Component were impingement mixed wherein the ratio by weight of the "A" Component to the "B" Component was 1.38:1. The impingement mixture was injected into a steel mold having an internal dye dimension of 5 in. ×9½ in. ×⅛ in. and the mold was heated to 229° F. (109° C. The surfaces were spray coated each time with Lift[3] a mold release agent made by Frekote Company. The cure time was from 10–20 seconds for the moldings. The mold was completely filled and the molding could be demolded intact without cracking or damage. The moldings were post cured in an oven at a temperature of 325° F. (163° C.) for about 1.5 hours. The condition of the moldings after post cure was tough and stiff. The flexural modulus at 73° F. (22.78° C.) of the moldings was 330,000±11,000 psi.

EXAMPLES 2-7, 12, 13 and 14

RIM polyureas were processed according to the procedure similar to that of Example 1, wherein a commercially available polyisocyanate was reacted with a "B" Component according to the processing characteristics found in Table IV. "B" components containing zinc stearate required heating in order to dissolve the solid completely. The Zinc stearate was dissolved in the blend of the other ingredients, under an inert atmosphere, at about 70° C. and stirred periodically until the solid dissolved. In all cases, the polymer was observed to have filled the mold completely and the moldings could be demolded intact without damage.

The final properties of the moldings, after postcure, are listed in Table IV.

EXAMPLE 8

The "A" Component was prepared by blending together Polyisocyanate D and Polyisocyanate A under nitrogen purge in a mixer containing a Lightning stirrer. Thereafter the "A" Component was placed in a container of the RIM machine. The "B" Component, was prepared from a blended mixture of Polyamine A, Polyamine B, and Polyamine H. The solid zinc stearate was dissolved in this blend by heating, under inert atmosphere, to about 70° C. and stirring periodically until all the solid dissolved. The solid dodecanedioic acid was dissolved subsequently, in an analogous manner, at 150° C. This "B" component was then transferred to a separate container of the RIM machine. The polyurea molding was processed according to the procedure found in Example 1 and the processing data in Table IV. As in the previous examples, polymer was observed to have filled the mold completely and the plaques could be demolded in tact without damage. The final properties, after postcure, are reported in Table IV.

EXAMPLES 9, 10, and 11

The "A" Components in Examples 9-11 were prepared by the procedure found in Example 8 and the "B" Component was prepared as in Example 1, except that the zinc stearate was dissolved into the other ingredients of the "B" Component by heating to about 70° C., under inert atmosphere, and stirring periodically. The polyurea moldings were processed by a procedure analagous to that used in in Example 1 and the processing data in Table IV. The moldings prepared in examples 9-11 could be demolded intact and without damage. In all cases, the polymer was observed to have filled the mold completely. The physical properties of the moldings, after postcure, are reported in Table IV.

EXAMPLE 15

The "A" Component was prepared by reacting Polyisocyanate G and Polyol A to form a prepolymer with an isocyanate equivalent weight of 181, the same as Polyisocyanate D. A calculation was done to determine the amount of Polyisocyanate G and Polyol A to be used as follows:

$$\text{Equivalent Weight of Prepolymer} = \frac{\text{Total Weight of Prepolymer}}{\frac{\text{Polyisocyanate Weight}}{\text{(Equivalent weight of polyisocyanate)}} - \frac{\text{Polyol Weight}}{\text{(Equivalent weight of polyol }A\text{)}}}$$

$$181 = \frac{100}{\frac{X}{125} \quad \frac{(100-X)}{156.7^*}}$$

*This equivalent weight for Polyol A was measured for the particular lot used to prepare this prepolymer. It differs slightly from the theoretical value of 160.5 (Table III).

wherein X represents the amount of Polyisocyanate G and was found to be 82.79 percent by weight of the prepolymer. The amount of Polyol A was 17.21 percent by weight.

Based on the above calculation, 3725.55 grams of Polyisocyanate G was placed in a 5-liter 3 neck flask. A thermometer and adaptor were inserted in one next of the flask, a glass stir rod encased in a glass bearing was inserted in the middle neck of the flask; and a pressure-equalizing addition funnell containing Polyol A was inserted into the third neck. A dry nitrogen supply, to maintain a positive pressure in the flask, was used to keep moisture out of the system. 774.45 grams of Polyol A was added to the Polyisocyanate G such that (i) the polyol did not contact the glass side of the flask; (ii) there was no gellation of the polyol and polyisocyanate: and (iii) the reaction temperature was maintained between 75° and 85° C. The addition required about ½ hr. After the addition of the polyol to the polyisocyanate was completed, the prepolymer was allowed to cook at 80° C. for 1 hour, maintaining the nitrogen pressure and the agitation. The prepolymer was placed in a container on the RIM machine. The "B" component made up of a blend of 1086.5 grams of Polyamine A, 1435.0 grams of Polyamine B and 478.5 grams of Polyamine I was placed in a second container of the RIM machine. The polyurea moldings were prepared according to the procedure analogous to that described in Example 1 and the processing data listed in Table IV. The moldings could be removed from the mold intact, without damage. The polymer was observed to have filled the mold completely. The properties of the moldings, after postcure, are reported in Table IV.

EXAMPLE 16

The "A" Component was prepared by reacting 3505.5 grams of Polyisocyanate G with 992.51 grams of Pre-dried Polyol B and 1.99 grams of phosphoric acid. The amount of polyisocyanate was determined by the method found in Example 15 so as to produce a prepolymer with an equivalent weight of about 181. The composition of the prepolymer was calculated based upon the measured hydroxyl equivalent weight of the final, pre-dried and phosphoric acid neutralized, polyol B. The Polyol B was pre-dried by passage through a thin film evaporator under the conditions of 0.25 mmHg (vacuum) pressure and with refluxing trichlorobenzene(bp 210° C.) in the heating jacket. After the polyol passed through the evaporator but before addition to the polyisocyanate, the phosphoric acid was added to the polyol and mixed thoroughly. The combined polyol and phosphoric acid were immediately added to the Polyisocyanate G over 0.5 hour and at about 75° C. The prepolymer was cooked at 75° C. for an additional 1 hour. This preparation was conducted under an atmosphere of dry nitrogen, with continuous agitation. The "A" Component and "B" Component were charged into separate containers and polyurea moldings were prepared according to the procedure analogous to Example 1 and the processing data in Table IV. The polymer was observed to have filled the entire mold and the molding could be removed intact, without damage. The properties of the moldings, after postcure, are listed in Table IV.

EXAMPLES 17, 18, and 19

The "A" Component is a prepolymer which was prepared by first blending two commercial polyisocyanates together according to the procedure in Example 8 and then reacting the blended polyisocyanate with Polyol B by the procedure as found in Example 16. The "B" Components were prepared by first blending the liquid ingredients and then dissolving the solid zinc stearate at about 70° C., under inert atmosphere, as described for Example 3. The "A" Component and "B" Component were placed into separate containers of the RIM machine and polyurea moldings were prepared according to a procedure analogous to that in Example 1 and the processing data in Table IV.

The polymer was observed to have completely filled the mold in all cases, and the moldings could be demolded and intact without damage. The properties of the polymers, after postcure, are listed in Table IV. The moldings of Example 19 had a tendency to blister during postcure and samples for physical property evaluation were obtained by postcuring some of the moldings, of this system, between clamped steel plates.

EXAMPLE 20

The "A" Component was prepared by blending 2238.3 grams of prepolymer of Example 15 with 644.7 grams of Polyisocyanate G and 113.9 grams of Polyisocyanate F. The "B" Component was prepared by a method exactly analogous to that used in Examples 17–19. The "A" Component and "B" Component were placed in separate containers of the RIM machine and polyurea moldings were prepared according to the procedure analogous to that used in in Example 1 and the processing data in Table IV.

The polymer was observed to have filled the mold completely, and moldings could be demolded intact, without damage. The properties of the moldings, after post cure, are listed in Table IV.

The properties and the processability of RIM formulations varies with the machine used. Valid comparisons generally require that the formulations be compared on the same type of machine. A small, pneumatically operated, laboratory RIM machine was used to prepare the polymers of the examples discussed above. This machine operates at lower mixing pressures (both Components) than most production-scale-RIM machines. The moldings prepared from the formulations according to the invention were invariably observed to be demoldable intact, without breakage. Most of these systems exhibited some degree of brittleness on demold (ie. the moldings were breakable by hand). This brittleness disappeared on postcure. The machine used in these experiments tends to magnify this brittleness phenomenon. Two formulations, those of Example 7 and 19, yielded moldings having a noticeably higher degree of toughness at time of demold and could not generally be broken by hand. It is notable that these formulations were prepared entirely with aromatic amines which are kinetically symmetrical. All the other formulations of the invention were prepared using a kinetically unsymmetrical aromatic polyamine.

TABLE IV

| | \_\_\_\_Examples\_\_\_\_ | | | | | | | | | |
|---|---|---|---|---|---|---|---|---|---|---|
| | 1 | 2 | 3 | 4 | 5 | 6 | 7 | 8 | 9 | 10 |
| "A" Component (% bw) | | | | | | | | | | |
| Polyisocyanate D | 58.04 | 54.99 | 54.99 | 55.26 | 49.54 | 51.67 | 49.57 | 27.49 | 26.67 | 27.00 |
| Polyisocyanate A | — | — | — | — | — | — | — | 27.50 | 26.68 | 27.01 |
| Polyisocyanate C | | | | | | | | — | — | — |
| Polyisocyanate G | | | | | | | | | | |
| Polyisocyanate B | | | | | | | | | | |
| Polyol A | | | | | | | | | | |
| Polyol B | | | | | | | | | | |
| Polyisocyanate F | | | | | | | | | | |
| "B" Component (% bw) | | | | | | | | | | |
| Polyamine A | 16.30 | 16.30 | 16.30 | 16.30 | 16.30 | 16.30 | — | 16.30 | 16.30 | 16.50 |
| Polyamine B | 25.66 | 21.53 | 21.53 | 21.26 | 14.16 | 17.03 | 21.53 | 21.53 | 13.73 | 12.66 |
| Polyamine I | — | 7.18 | 7.18 | — | 20.00 | 15.00 | 7.18 | — | — | — |
| Zinc Stearate(pbw) | — | — | 1.00 | 1.00 | 1.00 | 1.00 | 1.00 | 1.00 | 1.00 | 1.01 |
| Polyamine H | — | — | — | 7.18 | — | — | — | 7.18 | 14.00 | 14.18 |
| Chain Extender D | | | | | | — | 21.72 | — | — | — |
| Dodecanedioic Acid | | | | | | — | — | 1.00 | — | — |
| Polyamine E | | | | | | — | — | — | 2.62 | — |
| Polyamine F | | | | | | — | — | — | — | 2.65 |
| Polyamine C | | | | | | | | | | |
| Polyamine G | | | | | | | | | | |
| *Ratio (A/B)= | 1.383 | 1.222 | 1.195 | 1.208 | 0.963 | 1.047 | 0.964 | 1.170 | 1.120 | 1.149 |
| Content I (%) | 25.66 | 21.53 | 21.53 | 21.26 | 14.16 | 17.03 | 21.53 | 21.53 | 13.73 | 15.31 |
| Content II (%) | 72.1 | 60.5 | 60.5 | 59.7 | 39.8 | 47.9 | 60.5 | 56.0 | 35.7 | 45.4 |
| Content III | — | 5.3 | 5.3 | 5.2 | 1.5 | 2.2 | 6.0 | 5.3 | 2.3 | 2.2 |
| Content IV (%) | 38.8 | 43.1 | 43.1 | 43.4 | 53.5 | 48.9 | 50.2 | 43.1 | 57.9 | 51.9 |
| Index= | 1.03 | 1.03 | 1.03 | 1.03 | 1.03 | 1.03 | 1.03 | 1.122 | 1.150 | 1.04 |
| Processing Characteristics | | | | | | | | | | |
| Mold Temp (°C.) | 109 | 109 | 107 | 106 | 118 | 100 | 99 | 103 | 103 | 103 |
| "A" Comp Temp (°C.) | 73 | 74 | 74 | 83 | 73 | 93 | 83 | 93 | 52 | 54 |
| "B" Comp Temp (°C.) | 39 | 30 | 32 | 67 | 72 | 66 | 89 | 49 | 47 | 53 |
| Postcure: | | | | | | | | | | |
| Temp (°C.) | 163 | 163 | 163 | 163 | 135;163 | 135;163 | 135;163 | 135;163 | 135;163 | 135;163 |
| Time (hr) | 1.5 | 1.5 | 1.5 | 2 | 1  1 | 1  1 | 1  1 | 1  1 | 1  1 | 1  1 |
| Properties | | | | | | | | | | |
| Flexural Modulus ($10^3$ psi) | | | | | | | | | | |
| 73° F. | 330 | 302 | 297 | 337 | 226 | 261 | 308 | 307 | 298 | 320 |
| −20° F. | 419 | 381 | 363 | 463 | 326 | 350 | 399 | 390 | 391 | 437 |
| 158° F. | 282 | 246 | 230 | 226 | 180 | 211 | 226 | 263 | 210 | 243 |
| Ratio (−20°/158°) | 1.49 | 1.55 | 1.58 | 2.05 | 1.81 | 1.66 | 1.77 | 1.48 | 1.86 | 1.8 |
| Notched Izod-(ft-lb/in) | 0.55 | 1.89 | 1.77 | 1.64 | 2.60 | 3.07 | 0.8 | 1.71 | 0.98 | 0.58 |
| Heat Sag-(6",1 hr,325° F.) | 1.17 | 0.23 | .72 | 1.58 | .92 | 1.83 | 1.16 | 0.35 | 0.23 | 0.16 |
| CLTE-($10^{-5}$ in/in/°C.) | 6.77 | 8.16 | 7.57 | 7.14 | 9.5 | 8.32 | 8.22 | 8.26 | 7.92 | — |
| Tensile Strength (psi)= | 10,968. | 10,751. | 10,194. | 10,450. | 11,211. | 7927. | — | — | — | — |

| | \_\_\_\_Examples\_\_\_\_ | | | | | | | | | |
|---|---|---|---|---|---|---|---|---|---|---|
| | 11 | 12 | 13 | 14 | 15 | 16 | 17 | 18 | 19 | 20 |
| "A" Component (% bw) | | | | | | | | | | |
| Polyisocyanate D | 41.24 | | | | | | | | | |
| Polyisocyanate A | — | | | | | | | | | |
| Polyisocyanate C | 13.75 | | | | | | | | — | 13.03 | — |

TABLE IV-continued

| | | | | | | | | | | |
|---|---|---|---|---|---|---|---|---|---|---|
| Polyisocyanate G | | 49.00 | 57.03 | — | 45.53 | 42.84 | 41.14 | 40.37 | 32.35 | 45.84 |
| Polyisocyanate B | | — | — | 57.03 | — | — | — | | | |
| Polyol A | | — | — | — | 9.46 | — | — | — | — | 7.06 |
| Polyol B | | — | — | — | — | 12.15 | 12.32 | 12.08 | 6.73 | — |
| Polyisocyanate F | | — | — | — | — | — | 2.86 | 2.81 | — | 2.09 |
| "B" Component (% bw) | | | | | | | | | | |
| Polyamine A | 16.30 | 16.30 | 16.30 | 16.30 | 16.30 | 16.30 | 15.82 | 16.30 | — | 14.00 |
| Polyamine B | 21.53 | 34.70 | — | — | 21.53 | 21.53 | 20.89 | 21.26 | 24.41 | 21.53 |
| Polyamine I | — | — | — | — | 7.18 | 7.18 | 6.97 | | | |
| Zinc Stearate (pbw) | 1.00 | 1.00 | 1.00 | 1.00 | — | — | 1.00 | 1.00 | 1.00 | 1.00 |
| Polyamine H | 7.18 | | | | | | | 7.18 | 7.18 | 7.18 |
| Chain Extender D | — | | | | | | | | | |
| Dodecanedioic Acid | — | | | | | | | | | |
| Polyamine E | — | | | | | | | — | 16.30 | — |
| Polyamine F | — | | | | | | | | | |
| Polyamine C | | — | 26.67 | 26.67 | — | — | — | | | |
| Polyamine G | | | | | | | | — | — | 2.30 |
| *Ratio (A/B)= | 1.195 | 0.942 | 1.30 | 1.30 | 1.222 | 1.222 | 1.261 | 21.26 | 24.41 | 23.83 |
| Content I (%) | 21.53 | 34.70 | 26.67 | 26.67 | 21.53 | 21.53 | 20.89 | 61.7 | 63.5 | 69.8 |
| Content II (%) | 57.5 | 78.1 | 84.6 | 84.6 | 60.5 | 61.6 | 60.6 | 5.2 | 5.7 | 5.3 |
| Content III | 5.3 | — | — | — | 5.3 | 5.3 | 5.3 | 43.4 | 40.0 | 37.00 |
| Content IV (%) | 43.1 | 32.0 | 37.9 | 37.9 | 43.1 | 43.1 | 43.1 | 1.208 | 1.066 | 1.195 |
| Index= | 1.11 | 1.10 | 1.10 | 1.10 | 1.03 | 0.99 | 1.04 | 0.98 | 1.16 | 1.11 |
| Processing Characteristics | | | | | | | | | | |
| Mold Temp (°C.) | 103 | 103 | 108 | 108 | 107 | 107 | 109 | 109 | 103 | 102 |
| "A" Comp Temp (°C.) | 93 | 69 | 69 | 67 | 67 | 67 | 77 | 76 | 94 | 99 |
| "B" Comp Temp (°C.) | 49 | 63 | 70 | 70 | 27 | 27 | 57 | 53 | 102 | 94 |
| Postcure: | | | | | | | | | | |
| Temp (°C.) | 135;163 | 135;163 | 135;163 | 135;163;204 | 135;163 | 135;163 | 135;163 | 135;163 | 135;163 | 135;163 |
| Time (hr) | 1  1 | 1  1 | 1  1 | 1  1 | 1  1 | 1  1 | 1  1 | 1  1 | 1  1 | 1  1 |
| Properties | | | | | | | | | | |
| Flexural Modulus (10³ psi) | | | | | | | | | | |
| 73° F. | 360 | 309 | 399 | 410 | 283 | 305 | 300 | 331 | 356 | 320 |
| −20° F. | 439 | 358 | 438 | 444 | 406 | 399 | 387 | 439 | 450 | 407 |
| 158° F. | 267 | 250 | 351 | 344 | 224 | 189 | 175 | 183 | 259 | 222 |
| Ratio (−20°/158°) | 1.64 | 1.43 | 1.25 | 1.29 | 1.81 | 2.11 | 2.21 | 2.4 | 1.74 | 1.83 |
| Notched Izod-(ft-lb/in) | 0.73 | 0.61 | 0.46 | 0.42 | 1.72 | 1.94 | 4.22 | 3.24 | 1.35 | 0.87 |
| Heat Sag-(6",1 hr,325° F.) | 1.76 | 2.50 | 0.49 | 0.54 | 0.40 | 0.38 | 1.32 | 0.81 | >2.5 | 1.91 |
| CLTE-(10⁻⁵ in/in/°C.) | — | — | — | — | — | — | — | — | — | — |
| Tensile Strength (psi)= | — | | | | | | | | | |

*Weight ratio of Component A/Component B, as processed.

What is claimed is:

1. A blend of polyamines which consist essentially of
   (i) from 25 to 60% by weight of an isocyanate-reactive aromatic polyamine containing one or more aromatic rings; wherein the nitrogen atom of each reactive (primary and/or secondary) amine group is bonded directly to an aromatic ring, the molecular weight of said aromatic polyamine is between 93 and about 400, the reactive amine functionality is between 1.9 and 3.0, the aromatic polyamine is at least 50 mol percent diamines, and at least 60% of the molecular weight of said aromatic polyamine is due to the atoms contained within, or bonded directly to, aromatic rings; and
   (ii) from 75 to 40% by weight of an aliphatic polyamine containing acyclic, linear or branched, chains of atoms between isocyanate-reactive (primary and/or secondary) amine groups; wherein the nitrogen atom of each reactive amine group is bonded directly to aliphatic carbon atoms, the molecular weight of said aliphatic polyamine is between 170 and about 500, the reactive amine functionality of said aliphatic polyamine is between 1.9 and 2.5, and at least 50 mol percent of reactive amine containing species in said aliphatic polyamine are diamines, wherein, in said blend, at least 85% of the active hydrogen-containing groups are primary and/or secondary amine based on the total number of active hydrogen-containing groups in components (i) and (ii), said blend being use as an active hydrogen composition in the manufacture, by a reaction injection molding process, of a polyurea resin having a flexural modulus greater than 200,000 psi.

2. A blend of claim 1 wherein said aromatic polyamine is at least 50 mol percent primary diamines.

3. A blend of claim 1 wherein less than 60% of the average molecular weight of the aliphatic polyamine consists of atoms incorporated within or bonded directly to rings of 7 members or less.

4. A blend of claim 9 wherein the molecular weight of said aromatic polyamine ranges from 108–300.

5. A blend of claim 1 wherein said aliphatic polyamine has a molecular weight ranging from 200–450, wherein said aliphatic polyamine is substantially free of individual amine species of less than 200 or greater than 500 molecular weight, wherein substantially all primary amines which are present in said aliphatic polyamine are bonded directly to secondary and/or tertiary carbon atoms, and wherein the reactive amine functionality ranges from about 2.0 to 2.1.

6. A blend of claim 1 further comprising other isocyanate-reactive amine compounds having a molecular weight ranging from 1500–100,000.

7. A blend of claim 6 wherein the weight ratio of the blend of claim 1 to said other isocyanate-reactive amine compounds ranges from 1.5:1 to 100:1.

8. A blend of claim 7 wherein said other isocyanate-reactive amine compound has an amine functionality ranging from 2 to 6.

9. A blend of claim 7, wherein at least of the isocyanate-reactive functional groups on said other isocyanate-reactive amine compounds are primary and/or secondary amine groups.

10. A blend of claim 1, wherein at least one of the aliphatic and aromatic polyamine ingredients is kinetically symmetrical.

11. A reaction system used to prepare reaction injection molded polyureas, comprising
(A) a polyisocyanate having an isocyanate functionality from 1.8 to 4, an isocyanate equivalent weight from 60 to 1000, a viscosity from 2 to 5000 centipoises at its processing temperature, and is at least 50 mol percent diisocyanates, and
(B) a blend of polyamines which consists essentially of
(i) from 25 to 60% by weight of an isocyanate-reactive aromatic polyamine containing one or more aromatic rings: wherein the nitrogen atom of each reactive (primary and/or secondary) amine group is bonded directly to an aromatic ring, the molecular weight of said aromatic polyamine is between 93 and about 400, the reactive amine functionality is between 1.9 and 3.0, the aromatic polyamine is at least 50 mol percent diamines, and at least 60% of the molecular weight of said aromatic polyamine is due to the atoms contained within, or bonded directly to, aromatic rings and
(ii) from 75 to 40% by weight of an aliphatic polyamine containing acyclic, linear or branched, chains of atoms between isocyanate-reactive (primary and/or secondary) amine groups; wherein the nitrogen atom of each reactive amine group is bonded directly to aliphatic carbon atoms, the molecular weight of said aliphatic polyamine is between 170 and about 500, the reactive amine functionality of said aliphatic polyamine is between 1.9 and 2.5, and at least 50 mol percent of reactive amine containing species in said aliphatic polyamine are diamines,
and wherein
(a) the amount of said aliphatic polyamine composition (B)(ii) is from about 12 to about 40 percent of the total weight of the system;
(b) at least 85% of active hydrogen-containing groups in said component (B) are primary and/or secondary amine groups;
(c) at least 80% of active hydrogen-containing groups in either (B)(i) or (B)(ii) individually are primary and/or secondary amine groups; and
(d) said system is used to manufacture a polyurea having a flexural modulus greater than 200,000 psi (73° F.) and a theoretical hardblock content greater than 70%.

12. A system of claim 11 wherein said polyisocyanate has an isocyanate functionality ranging from 2 to 2.5, an isocyanate equivalent weight of 80–500 and a viscosity ranging from 15–1000 centipoises, and is at least 75 mol percent diisocyanates.

13. A system of claim 11 wherein said aromatic polyamine has a molecular weight of from 108 to 300, an amine functionality of from 2–2.5, said aliphatic polyamine has a molecular weight ranging from 200 to 450, an amine functionality ranging from 2–2.1, and is substantially free of individual amines species of less than 200 or greater than 500 molecular weight, wherein substantially all primary amines which are present in said aliphatic polyamine are bonded directly to secondary and/or tertiary carbon atoms, and wherein the amount of the aliphatic polyamine is from about 12.5–30 percent by weight of the total reactive ingredients.

14. A system of claim 11 wherein at least one of the aromatic and aliphatic polyamine ingredients is kinetically symmetrical.

15. A system of claim 11 wherein said aromatic polyamine is selected from the group consisting of 3,3'-dimethyl-5,5'-diethyl-4,4'-diaminodiphenylmethane, and polyphenyl polymethylene polyamine.

16. A system of claim 11 wherein said aliphatic polyamines are selected from those having less than 50 percent of the average molecular weight of the aliphatic polyamine consisting of atoms incorporated within or bonded directly to rings of 7 members or less.

17. A system of claim 11, further comprising an internal mold release agent.

18. A system of claim 17 wherein said mold release agent is zinc stearate.

19. A system of claim 11 wherein said polyamine blend further comprises other isocyanate-reactive amine compounds having a molecular weight ranging from 1500–100,000.

20. A system of claim 19 wherein at least 85% of the isocyanate-reactive functional groups on said other, high molecular weight, isocyanate reactive amine compounds are primary and/or secondary amine groups.

21. A system of claim 19 wherein the weight ratio of said polyamine blend to said other isocyanate-reactive amine compounds ranges from 1.5:1 to 100:1.

22. A system of claim 19 wherein said other isocyanate-reactive amine compound has an amine functionality ranging from 2 to 6.

23. A system of claim 11, further comprising at least one additive.

24. A system of claim 11 which comprises a modified polyisocyanate prepolymer made by reacting 2,4'- and or 4,4'-diphenylmethane diisocyanate with a mixture of low molecular weight glycols, said prepolymer having an isocyanate equivalent weight of between 143 and 181; a primary amine-terminated linear polyoxypropylene diamine having a molecular weight of 400; diethyltoluene diamine, and a primary amine terminated polyoxypropylenetriamine having a molecular weight of 5000.

25. A polyurea polymer which comprises the reaction product of a reaction system as defined in claim 11.

26. A polyurea having a flexural modulus ranging from 200,000 psi to 500,000 psi at 73° F. when measured according to ASTM D 790 test method and a coefficient of linear thermal expansion of less than $10 \times 10^{-5}$ inch-per-inch per degree °C. when measured according to test ASTM D 696.

27. A molded article made by impingement mixing the compounds of a system as defined in claim 11, injecting said mixture into a mold, demolding said molded article and postcuring said article at a temperature of at least 100° C.

* * * * *

UNITED STATES PATENT AND TRADEMARK OFFICE
CERTIFICATE OF CORRECTION

PATENT NO. : 4,798,862

DATED : January 17, 1989

INVENTOR(S) : Herbert R. Gillis, Jr.

It is certified that error appears in the above-identified patent and that said Letters Patent is hereby corrected as shown below:

Col. 19,

Claim 1, line 65 after the word "amine" the word --groups-- has been omitted.

Col. 20,

Claim 9, line 67 - after the words "at least" the word --85%-- has been omitted.

Signed and Sealed this

Third Day of December, 1991

Attest:

HARRY F. MANBECK, JR.

Attesting Officer

Commissioner of Patents and Trademarks